United States Patent
Boardman et al.

(10) Patent No.: US 12,475,372 B2
(45) Date of Patent: *Nov. 18, 2025

(54) MACHINE-LEARNING TECHNIQUES INVOLVING MONOTONIC RECURRENT NEURAL NETWORKS

(71) Applicant: EQUIFAX INC., Atlanta, GA (US)

(72) Inventors: Jonathan Boardman, Marietta, GA (US); Xiao Huang, Marietta, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,493

(22) Filed: Mar. 15, 2024

(65) Prior Publication Data

US 2024/0265255 A1     Aug. 8, 2024

Related U.S. Application Data

(63) Continuation of application No. 17/094,262, filed on Nov. 10, 2020, now Pat. No. 11,960,993.

(51) Int. Cl.
    *G06N 3/08*        (2023.01)
    *G06F 17/16*      (2006.01)
    *G06N 3/048*      (2023.01)

(52) U.S. Cl.
    CPC .............. *G06N 3/08* (2013.01); *G06F 17/16* (2013.01); *G06N 3/048* (2023.01)

(58) Field of Classification Search
    CPC .......... G06N 3/08; G06N 3/048; G06N 3/044; G06N 3/045; G06N 3/088; G06N 20/10; G06N 20/00; G06N 7/01; G06F 17/16; G06F 16/955; G06F 16/903; G06F 9/541; G06F 21/554; G06F 21/552; G06F 21/53;

(Continued)

(56) References Cited

U.S. PATENT DOCUMENTS 10,210,860 B1 * 2/2019 Ward ..................... G06N 3/044
10,565,498 B1 * 2/2020 Zhiyanov ............... G06N 3/045

(Continued)

FOREIGN PATENT DOCUMENTS

CA        3041649 A1 * 5/2018 ........... G06V 10/454
CN     108108657 A  * 6/2018 ........... G06F 16/325

(Continued)

OTHER PUBLICATIONS

U.S. Appl. No. 17/094,262, Notice of Allowance, Mailed on Dec. 26, 2023, 20 pages.

(Continued)

*Primary Examiner* — Steven P Sax
(74) *Attorney, Agent, or Firm* — Kilpatrick Townsend & Stockton LLP

(57) ABSTRACT

Various aspects involve a monotonic recurrent neural network (MRNN) trained for risk assessment or other purposes. For instance, the MRNN is trained to compute a risk indicator from a predictor variable. Training the MRNN includes adjusting weights of nodes of the MRNN subject to a set of monotonicity constraints, wherein the set of monotonicity constraints causes output risk indicators computed by the RNN to be a monotonic function of input predictor variables. The trained monotonic RNN can be used to generate an output risk indicator for a target entity.

20 Claims, 7 Drawing Sheets

(58) Field of Classification Search
CPC .... G06F 17/18; G06Q 40/02; G06Q 30/0203; G06Q 10/10; G06Q 40/06; G06Q 40/12; G06Q 20/4016; G06Q 40/04; H04L 63/1433; H04L 63/20; H04L 63/1483; G06V 10/764; G06V 10/82

See application file for complete search history.

(56) References Cited

U.S. PATENT DOCUMENTS

| | | | |
|---|---|---|---|
| 10,963,791 | B2 | 3/2021 | Turner et al. |
| 11,275,994 | B2 * | 3/2022 | Baughman ............. G06N 5/025 |
| 11,960,993 | B2 * | 4/2024 | Boardman ............. G06Q 40/08 |
| 2017/0200066 | A1 * | 7/2017 | Wang ..................... G06N 3/045 |
| 2017/0366353 | A1 | 12/2017 | Struttmann |
| 2018/0336459 | A1 * | 11/2018 | Baughman ............. G06N 5/025 |
| 2018/0357552 | A1 | 12/2018 | Campos et al. |
| 2019/0258251 | A1 | 8/2019 | Ditty et al. |
| 2019/0332919 | A1 | 10/2019 | Weiss et al. |
| 2020/0027545 | A1 * | 1/2020 | Xie ........................ G16B 40/00 |
| 2020/0035224 | A1 * | 1/2020 | Ward ..................... G10L 15/22 |
| 2020/0125886 | A1 | 4/2020 | Baijal et al. |
| 2020/0133952 | A1 * | 4/2020 | Sheinin .................. G06N 3/045 |
| 2020/0134387 | A1 | 4/2020 | Liu et al. |
| 2020/0134439 | A1 | 4/2020 | Turner et al. |
| 2020/0155101 | A1 | 5/2020 | Yasunaga et al. |
| 2020/0296134 | A1 | 9/2020 | Sreedhar et al. |
| 2020/0314101 | A1 * | 10/2020 | Zhang ................. H04L 63/1433 |
| 2020/0349430 | A1 * | 11/2020 | Schmidtler ............ G06N 3/084 |
| 2021/0049503 | A1 | 2/2021 | Nourian et al. |
| 2021/0056422 | A1 * | 2/2021 | Thakker ................. G06N 3/044 |
| 2021/0201412 | A1 | 7/2021 | Goh |
| 2021/0241141 | A1 | 8/2021 | Dugger et al. |
| 2021/0295175 | A1 | 9/2021 | Kennel et al. |
| 2021/0326881 | A1 | 10/2021 | Handelman |
| 2021/0390190 | A1 | 12/2021 | Walker et al. |
| 2022/0103589 | A1 | 3/2022 | Shen et al. |
| 2022/0335348 | A1 | 10/2022 | Miller et al. |
| 2023/0297847 | A1 * | 9/2023 | Turner .................... G06N 3/082 706/15 |

FOREIGN PATENT DOCUMENTS

| | | | | |
|---|---|---|---|---|
| CN | 109409677 | A | | 3/2019 |
| CN | 109492945 | A | | 3/2019 |
| CN | 110163187 | A | * | 8/2019 ......... G06K 9/00818 |
| CN | 110188227 | A | * | 8/2019 ........... G06F 16/583 |
| CN | 110347719 | A | | 10/2019 |
| CN | 110458697 | A | | 11/2019 |
| CN | 111353728 | A | | 6/2020 |
| CN | 111796518 | A | * | 10/2020 ........... G05B 13/027 |
| CN | 112307218 | A | * | 2/2021 ........... G06F 16/367 |
| CN | 112381647 | A | | 2/2021 |
| CN | 108197702 | B | * | 7/2022 ............. G06N 3/045 |
| CN | 110807335 | B | * | 6/2023 ........... G06F 16/367 |
| EP | 3699827 | A1 | | 8/2020 |
| EP | 3812929 | A1 | | 4/2021 |
| WO | 2018031940 | A1 | | 2/2018 |
| WO | 2019033088 | A1 | | 2/2019 |

OTHER PUBLICATIONS

Bahdanau et al., "Neural Machine Translation by Jointly Learning to Align and Translate", International Conference on Learning Representations, May 19, 2016, 15 pages.

Bengio et al., "Learning Long Term Dependencies with Gradient Descent is Difficult", Institute of Electrical and Electronics Engineers Transactions on Neural Networks, vol. 5, No. 2, Mar. 1994, pp. 157-166.

Boardman et al., "Radically Simplifying Gated Recurrent Architectures Without Loss of Performance", 2019 Institute of Electrical and Electronics Engineers International Conference on Big Data (Big Data), 2019, pp. 2615-2623.

Elman, "Finding Structure in Time", Cognitive Science, vol. 14, No. 2, 1990, pp. 179-211.

Gers et al., "Learning to Forget: Continual Prediction with LSTM", 1999 Ninth International Conference on Artificial Neural Networks, vol. 2, Sep. 7-10, 1999, 6 pages.

Graves et al., "Framewise Phoneme Classification with Bidirectional LSTM and Other Neural Network Architectures", Neural Networks, vol. 18, Issues 5-6, Jul.-Aug. 2005, 8 pages.

Greff et al., "Lstm: A Search Space Odyssey", Institute of Electrical and Electronics Engineers Transactions on Neural Networks and Learning Systems, vol. 28, No. 10, Oct. 2017, pp. 1-12.

Hochreiter et al., "Gradient Flow in Recurrent Nets: The Difficulty of Learning Long-Term Dependencies", A Field Guide to Dynamical Recurrent Neural Networks, 2001, pp. 1-15.

Hochreiter et al., "Long Short- Term Memory", Neural Computation, vol. 9, No. 8, 1997, pp. 1-32.

Pascanu et al., "On the Difficulty of Training Recurrent Neural Networks", Proceedings of the 30th International Conference on Machine Learning, Proceedings of Machine Learning Research, vol. 28, No. 3, 2013, 9 pages.

International Application No. PCT/US2021/072309, International Preliminary Report on Patentability, Mailed On May 25, 2023, 11 pages.

International Application No. PCT/US2021/072309, International Search Report and Written Opinion, Mailed On Mar. 2, 2022, 14 pages.

Zhang et al., "Feedforward Networks with Monotone Constraints", Institute of Electrical and Electronics Engineers, International Joint Conference on Neural Networks, vol. 3, Jul. 10-16, 1999, pp. 1820-1823.

* cited by examiner

MACHINE-LEARNING TECHNIQUES INVOLVING MONOTONIC RECURRENT NEURAL NETWORKS

CROSS-REFERENCE TO RELATED APPLICATIONS

This application is a continuation of U.S. Ser. No. 17/094,262, filed Nov. 10, 2020, and titled "MACHINE-LEARNING TECHNIQUES INVOLVING MONOTONIC RECURRENT NEURAL NETWORKS," the entire contents of which is hereby incorporated by reference.

TECHNICAL FIELD

The present disclosure relates generally to artificial intelligence. More specifically, but not by way of limitation, this disclosure relates to machine learning using monotonic recurrent neural networks, such as long short-term memory networks, that are trained for assessing risks or performing other operations with explainable outcomes.

BACKGROUND

In machine learning, neural networks can be used to perform one or more functions (e.g., acquiring, processing, analyzing, and understanding various inputs in order to produce an output that includes numerical or symbolic information). A neural network includes one or more algorithms and interconnected nodes that exchange data between one another. The nodes can have numeric weights that can be tuned based on experience, which makes the neural network adaptive and capable of learning. For example, tuning the numeric weights can be used to train the neural network such that the neural network can perform one or more functions on a set of input variables and produce an output that is associated with the set of input variables.

SUMMARY

Various aspects of the present disclosure provide systems and methods for training or using a monotonic recurrent neural network (MRNN) for risk assessment or other outcome prediction.

In an example of using the MRNN, a first computing system is configured to receive, from a second computing system, a risk assessment query that identifies a target entity. The first computing system provides, to the MRNN, a predictor variable for the target entity. Using the MRNN, the first computing system computes an output risk indicator from the predictor variable. In this example, the MRNN has one or more layers of nodes that are interconnected. The nodes include one or more hidden states having stored values based on predictor values of the predictor variable, and the nodes have weights causing outputs of the MRNN to be a monotonic function of input predictor variables input into the RNN. The first computing system transmits the output risk indicator to the second computing system, which is communicatively coupled to the first computing system. The second computing system is configured to control, based on the output risk indicator, access by the target entity to one or more interactive computing environments.

In an example of training the MRNN, a training server trains the MRNN to compute a risk indicator from a predictor variable. Training the MRNN includes accessing training samples, each training sample including a training predictor variable as well as a corresponding training risk indicator. The training further includes adjusting weights of nodes of the MRNN subject to a set of monotonicity constraints, wherein the set of monotonicity constraints causes output risk indicators computed by the RNN to be a monotonic function of input predictor variables.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
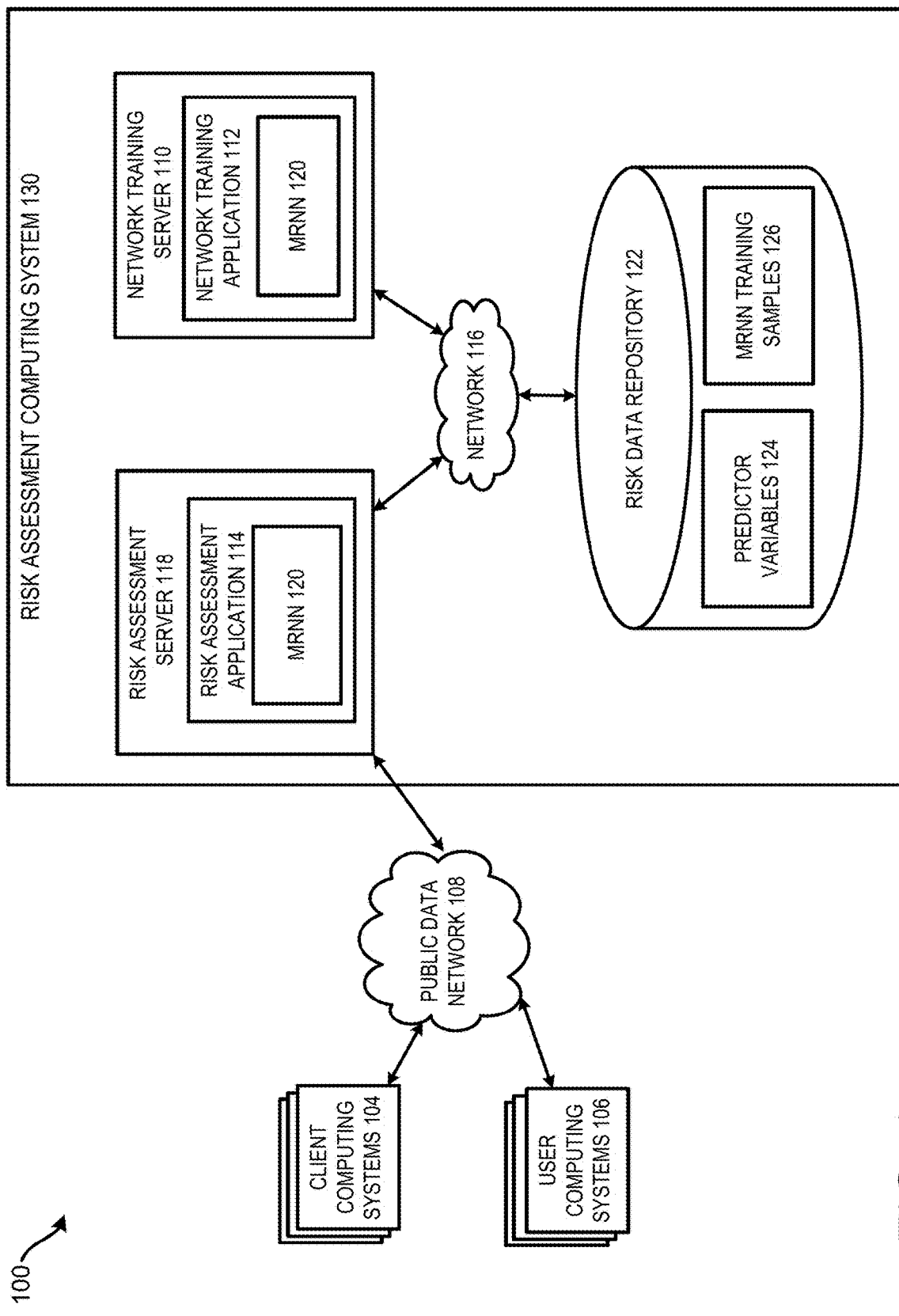
FIG. 1 is a diagram depicting an example of a computing environment in which a monotonic recurrent neural network (MRNN) can be trained and applied in a risk assessment application, according to certain aspects of the present disclosure.

Machine-learning techniques can involve inefficient expenditures or allocations of processing resources, a lack of desired performance or explanatory capability with respect to the applications of these machine-learning techniques, or both. In one example, the complicated structure of a neural network and the interconnections among various nodes in the neural network can increase the difficulty of creating a neural network that explains relationships between an input variable and an output of the neural network.

Monotonic neural networks can enforce monotonicity between input variables and output, thereby facilitating the formulation of explainable relationships between the input variables and the output. Constructing and training a monotonic neural network could be expensive with respect to, for example, processing resources, memory resources, network bandwidth, or other resources. This resource problem is especially prominent in cases where large training datasets are used for the machine learning or if the neural network has a large number of network layers or a large number of neural network nodes in each layer. The problem can be made further complex if a recurrent neural network is desired or required, such as in the case where it is desirable for the output to depend on a time series of one or more input variables. Although techniques have been studied for creating monotonic feedforward neural networks, such techniques are generally complex to implement and would prove even more complex if extended to a recurrent neural network.

Certain aspects described herein for constructing, training, and using a monotonic recurrent neural network for risk assessment or other outcome predictions can resolve one or more issues identified above and can do so in a manner that is relatively simple to implement. For example, a computing system enforces a set of one or more monotonicity constraints to train the MRNN. These monotonicity constraints cause the output of the MRNN to be a monotonic function of each input variable. The monotonicity constraints could require, for instance, that (1) activation functions used in the MRNN have derivatives that are always nonnegative, (2) weights of the nodes of the MRNN are all nonnegative, and (3) in the case of a long short-term memory (LSTM) network variation of the MRNN, the activation functions have strictly nonnegative ranges. These monotonicity constraints can be computationally inexpensive to implement. For instance, certain activation functions, such as sigmoid and such as rectified linear unit (ReLU), have strictly nonnegative ranges and have derivatives that are strictly nonnegative. Additionally, the weights of the nodes can be kept positive by using exponential weights (i.e., by using an exponential function as the weights) in a training process.

Certain aspects utilize a set of monotonicity constraints, such as the above, to ensure that a recurrent neural network is a monotonic recurrent neural network. For instance, the MRNN can have input-level monotonicity, such that the output has a monotonic relationship with each input variable individually. Monotonicity is useful to evaluate and explain the impact of input variables on the output. For example, in a risk assessment application, a monotonic relationship between each input variable and an output risk indicator can be utilized to explain the outcome of the prediction.

In certain aspects operations and data structures for neural networks improve how computing systems service analytical queries and, further, overcome one or more of the issues identified above. For instance, the MRNN presented herein is structured so that a monotonic relationship exists between each input variable and the output. Structuring such an MRNN can include constraining the recurrent neural network, such as through using activation functions and weights that meet certain criteria. Such a structure can improve the operations of the neural network by requiring relatively low computational expense for training, in comparison to the computational expense required in existing techniques for training feedforward neural networks that are monotonic, to result in a recurrent neural network that predicts an outcome that can be associated with explainable reasons for the predicted outcome.

Additional or alternative aspects can implement or apply certain rules that improve existing technological processes involving machine-learning techniques. For instance, to enforce the monotonicity of the recurrent neural network, a particular set of rules are employed in the architecting, training, or use of the MRNN. These rules, referred to herein as monotonicity constraints, can include requiring activation functions or weights of the neural network to meet certain criteria. Furthermore, additional rules can be introduced in the training the MRNN to further increase the efficiency of the training, such as rules for batch size or rules for updating weights. These particular rules enable the training to be performed efficiently (e.g., the training can be completed faster and requiring fewer computational resources) and effectively (e.g., the trained MRNN is stable, reliable, and monotonic).

The illustrative examples herein are given to introduce the reader to the general subject matter discussed and are not intended to limit the scope of the disclosed concepts. The following sections describe various additional features and examples with reference to the drawings in which like numerals indicate like elements, and in which descriptions are used to describe the illustrative examples but, like the illustrative examples, should not be used to limit the present disclosure.

Operating Environment Example for
Machine-Learning Operations

Referring now to the drawings, FIG. 1 is a block diagram depicting an example of an operating environment 100 in which a risk assessment computing system 130 builds and trains a monotonic recurrent neural network (MRNN) 120 that can be utilized to predict risk indicators based on predictor variables 124, also referred to as input variables.

Machine learning could be used to create a prediction model that determines a default probability (e.g., the probability of defaulting on a loan) based on a credit balance or a savings balance, or both. For example, a credit balance could be positively correlated with default probability, and a savings balance could be negatively correlated with default probability. However, due to unknown or confounding factors, a high savings balance combined with a very low credit balance could be associated with a locally higher default probability than would be the case with a slightly higher credit balance. An unconstrained neural network used as the prediction model might learn this idiosyncrasy, leading to a counterintuitive recommendation that some individuals could lower their default probability by increasing their credit balance. However, learning this idiosyncrasy leads to some problematic results. For instance, this recommendation is only valid in a limited range, and beyond this limited range, increasing the credit balance leads to an increased default probability. Thus, an explanation associated with this recommendation could be misunderstood. Further, certain regulations require that an explanation be given for a denial to extend credit. Such an explanation can be difficult to provide or to support if that explanation appears inconsistent with common understanding, as in the case of a recommendation to increase a credit balance. To address this problem, some aspects described herein train or use a monotonic recurrent neural network (MRNN) 120, such as that illustrated in FIG. 1. The MRNN 120 is a recurrent neural network (RNN) configured to determine a risk indicator having a monotonic relationship with each predictor variable provided as input.

FIG. 1 depicts examples of hardware components of a risk assessment computing system 130, according to some aspects. In some aspects, the risk assessment computing system 130 is a specialized computing system that may be used for processing large amounts of data using a large number of computer processing cycles. The risk assessment computing system 130 can include a network training server 110 for building and training an MRNN 120, wherein the output of the MRNN 120 has a monotonic relationship with each of the predictor variables 124 input to the MRNN 120. The risk assessment computing system 130 can further include a risk assessment server 118 for performing a risk assessment for given predictor variables 124 using the trained MRNN 120.

The network training server 110 can include one or more processing devices that execute program code, such as a network training application 112. The program code is stored on a non-transitory computer-readable medium. The network training application 112 can execute one or more processes to train an MRNN 120 for predicting risk indicators based on predictor variables 124 and for maintaining a monotonic relationship between the predictor variables 124 and the predicted risk indicators.

In some aspects, the network training application 112 can build and train MRNN 120 utilizing MRNN training samples 126. The MRNN training samples 126 can include multiple training vectors consisting of training predictor variables 124 and training risk indicator outputs corresponding to the training vectors. The MRNN training samples 126 can be stored in one or more network-attached storage units or other storage device on which various repositories, databases, or other structures are stored. An example of these data structures is the risk data repository 122, as shown in FIG. 1.

Network-attached storage units may store a variety of different types of data organized in a variety of different ways and from a variety of different sources. For example, the network-attached storage unit may include storage other than primary storage located within the network training server 110 that is directly accessible by processors located therein. In some aspects, the network-attached storage unit may include secondary, tertiary, or auxiliary storage, such as large hard drives, servers, virtual memory, or other types. Storage devices may include portable or non-portable storage devices, optical storage devices, or various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory or memory devices.

The risk assessment server 118 can include one or more processing devices that execute program code, such as a risk assessment application 114. The program code is stored on a non-transitory computer-readable medium. The risk assessment application 114 can execute one or more processes to utilize the MRNN 120 trained by the network training application 112 to predict risk indicators based on input predictor variables 124.

The risk assessment computing system 130 can communicate with various other computing systems, such as client computing systems 104. For example, client computing systems 104 may send risk assessment queries to the risk assessment server 118 for risk assessment, or may send signals to the risk assessment server 118 that control or otherwise influence different aspects of the risk assessment computing system 130. The client computing systems 104 may also interact with user computing systems 106 via one or more public data networks 108 to facilitate interactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other provider of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, or the like. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the client computing system 104 to be performed.

In some examples, a client computing system 104 may have other computing resources associated therewith (not shown in FIG. 1), such as server computers hosting and managing virtual machine instances for providing cloud computing services, server computers hosting and managing online storage resources for users, server computers for providing database services, and others. The interaction between the user computing system 106 and the client computing system 104 may be performed through graphical user interfaces presented by the client computing system 104 to the user computing system 106, or through application programming interface (API) calls or web service calls.

A user computing system 106 can include a computing device or other communication device operated by a user, such as a consumer or a customer. The user computing system 106 can include one or more computing devices, such as laptops, smartphones, or other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104 or other computing resources, to engage in mobile commerce with a client computing system 104, to obtain controlled access to electronic content hosted by the client computing system 104, or for other purposes.

For instance, the user can use the user computing system 106 to engage in an electronic transaction with a client computing system 104 via an interactive computing environment. An electronic transaction between the user computing system 106 and the client computing system 104 can include, for example, the user computing system 106 being used to request online storage resources managed by the client computing system 104, acquire cloud computing resources (e.g., virtual machine instances), and so on. An electronic transaction between the user computing system 106 and the client computing system 104 can also include, for example, query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the risk assessment server 118 for risk assessment. Based on the risk indicator predicted by the risk assessment server 118, the client computing system 104 can determine whether to grant the access request of the user computing system 106 to certain features of the interactive computing environment.

In a simplified example, the risk assessment computing system 130 depicted in FIG. 1 can configure an MRNN 120 to be used for accurately determining risk indicators, such as default probabilities (i.e., probabilities that certain entities will default if extended credit) or credit scores, using predictor variables. A predictor variable can be a variable predictive of risk that is associated with an entity. Various suitable predictor variables that are authorized for use by an appropriate legal or regulatory framework may be used.

Examples of predictor variables used for predicting the risk associated with an entity accessing online resources include, but are not limited to, variables indicating the demographic characteristics of the entity (e.g., name of the entity, the network or physical address of the company, the identification of the company, the revenue of the company), variables indicative of prior actions or transactions involving the entity (e.g., past requests of online resources submitted by the entity, the amount of online resource currently held by the entity, and so on), variables indicative of one or more behavioral traits of an entity (e.g., the timeliness of the entity releasing the online resources), or other predictors. Similarly, examples of predictor variables used for predicting the risk associated with an entity accessing services provided by a financial institute include, but are not limited to, variables indicative of one or more demographic characteristics of an entity (e.g., income), variables indicative of prior actions or transactions involving the entity (e.g., information that can be obtained from credit files or records, financial records, consumer records, or other data about the activities or characteristics of the entity), variables indicative of one or more behavioral traits of an entity, or other variables.

The predicted risk indicator can be utilized by a service provider to determine the risk associated with the entity accessing, or attempting to access, a service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the network training server 110 and the risk assessment server 118, may be instead implemented in a signal device or system.

Examples of Operations Using an MRNN Trained Via Machine Learning

Figure 2:
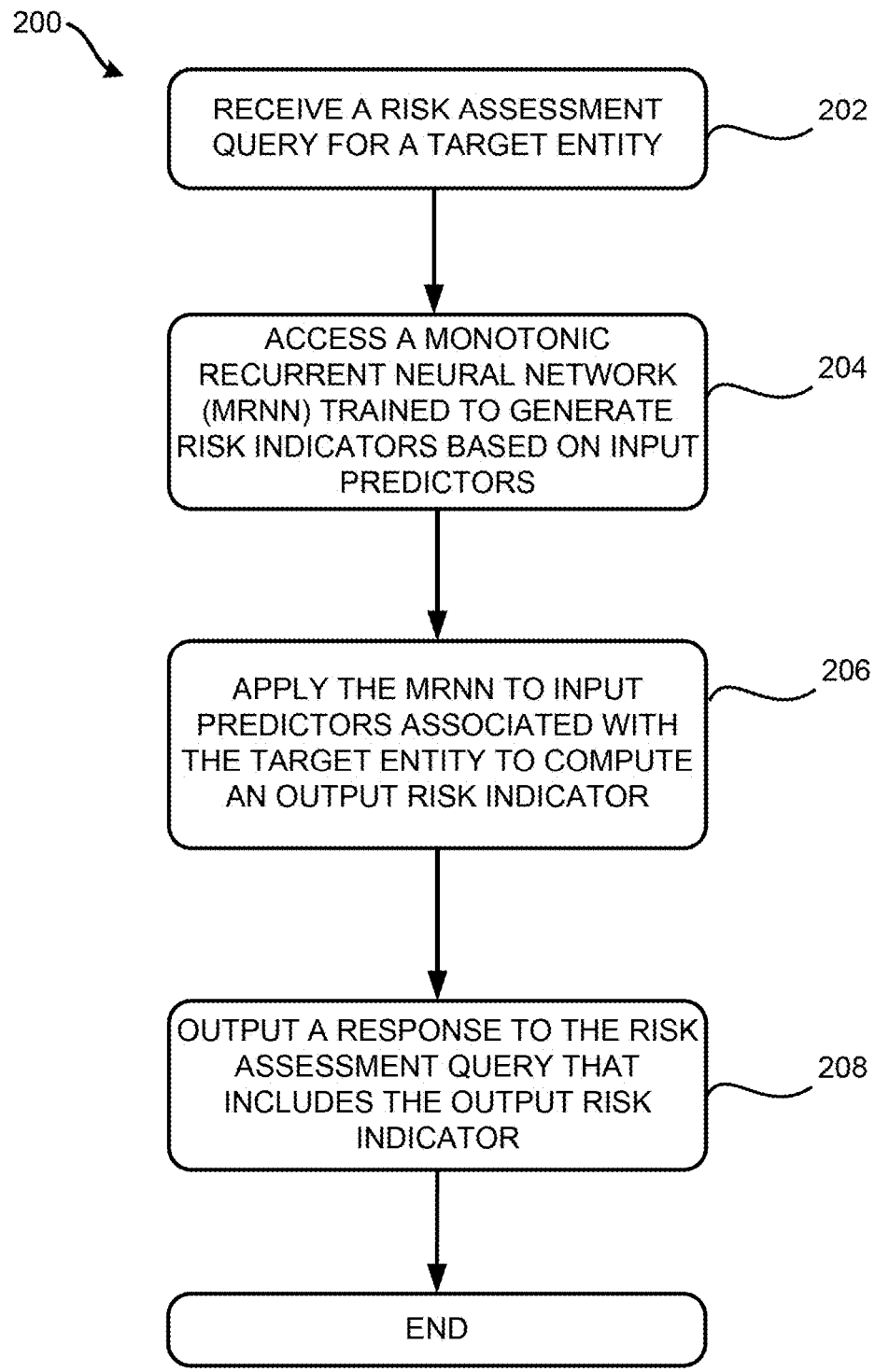
FIG. 2 is a flow diagram depicting an example of a process for utilizing an MRNN to generate a risk indicator for a target entity based on a predictor variable associated with the target entity, according to certain aspects of the present disclosure.

FIG. 2 is a flow diagram depicting an example of a process 200 for utilizing an MRNN 120 to generate a risk indicator for a target entity based on a set of one or more predictor variables 124 associated with the target entity. One or more computing devices (e.g., the risk assessment server 118) implement operations depicted in FIG. 2 by executing suitable program code (e.g., the risk assessment application 114). For illustrative purposes, the process 200 is described with reference to certain examples depicted in the figures. However, other implementations are possible.

At operation 202, the process 200 involves receiving a risk assessment query for a target entity, such as from a remote computing device, such as a computing device used by or otherwise associated with the target entity requesting the risk assessment. The risk assessment query can also be received by the risk assessment server 118 from a remote computing device associated with an entity authorized to request risk assessment of the target entity.

At operation 204, the process 200 involves accessing an MRNN 120 trained to generate risk indicators, also referred to as risk indicator values or risk indicator outputs, based on input predictor variables 124 or other data suitable for assessing risks associated with an entity. Examples of predictor variables 124 can include data associated with an entity that describes prior actions or transactions involving the entity (e.g., information that can be obtained from credit files or records, financial records, consumer records, or other data about the activities or characteristics of the entity), behavioral traits of the entity, demographic traits of the entity, or other traits that may be used to predict risks associated with the entity. In some aspects, predictor variables 124 can be obtained from credit files, financial records, consumer records, etc. The risk indicator can indicate a level of risk associated with the entity, such as a default probability of the entity (i.e., the probability that the entity will default).

The MRNN 120 can be constructed and trained based on MRNN training samples 126, also referred to herein as training samples 126, including training predictor variables 124 as inputs and training risk indicators as outputs. As described further below, monotonicity constraints can be imposed on the training of the MRNN 120 so that the MRNN 120 maintains a monotonic relationship between risk indicators and predictor variables 124. Additional details regarding the MRNN and training the MRNN are presented below.

At operation 206, the process 200 involves applying the MRNN 120 to generate a risk indicator for the target entity specified in the risk assessment query. One or more predictor variables 124 associated with the target entity can be used as inputs to the MRNN 120 for this purpose. The predictor variables 124 associated with the target entity can be obtained from a predictor variable database configured to store predictor variables 124 associated with various entities. In some aspects, the output of the MRNN 120 includes the risk indicator, such as a probability or other score, for the target entity based on its predictor variables 124.

At operation 208, the process 200 involves generating and transmitting a response to the risk assessment query. The response can include the risk indicator generated using the MRNN 120. Additionally, in some aspects, the response can include a recommendation based on the risk indicator as to how the target entity can improve the risk indicator (e.g., how the target entity can lower the default probability).

The risk indicator can be used for one or more operations that involve performing an operation with respect to the target entity based on a predicted risk associated with the target entity. In one example, the risk indicator can be utilized to control access to one or more interactive computing environments by the target entity. As discussed above with regard to FIG. 1, the risk assessment computing system 130 can communicate with client computing systems 104, which may send risk assessment queries to the risk assessment server 118 to request risk assessment. The client computing systems 104 may be associated with technological providers, such as cloud computing providers, online storage providers, or financial institutions such as banks, credit unions, credit-card companies, insurance companies, or other types of organizations. The client computing systems 104 may be implemented to provide interactive computing environments for customers to access various services offered by these service providers. Customers can utilize user computing systems 106 to access the interactive computing environments thereby accessing the services provided by these providers.

For example, a customer can submit a request to access the interactive computing environment using a user computing system 106. Based on the request, the client computing system 104 can generate and submit a risk assessment query for the customer to the risk assessment server 118. The risk assessment query can include, for example, an identity of the customer and other information associated with the customer that can be utilized to generate predictor variables 124. The risk assessment server 118 can perform a risk assessment based on predictor variables 124 generated for the customer and return the predicted risk indicator to the client computing system 104.

Based on the received risk indicator, the client computing system 104 can determine whether to grant the customer access to the interactive computing environment. If the client computing system 104 determines that the level of risk associated with the customer accessing the interactive computing environment and the associated technical or financial service is too high, the client computing system 104 can deny access by the customer to the interactive computing environment. Conversely, if the client computing system 104 determines that the level of risk associated with the customer is acceptable, the client computing system 104 can grant access to the interactive computing environment by the customer and the customer would be able to utilize the various services provided by the service providers. For example, with the granted access, the customer can utilize the user computing system 106 to access clouding computing resources, online storage resources, web pages or other user interfaces provided by the client computing system 104 to execute applications, store data, query data, submit an online digital application, operate electronic tools, or perform various other operations within the interactive computing environment hosted by the client computing system 104.

Determination of Monotonicity Constraints for Training an MRNN

As mentioned above, some aspects described herein train an MRNN 120 to determine risk indicators from predictor variables 124, such that the risk indicators have a monotonic relationship with each predictor variable. For instance, this training could be performed by the network training application 112 at the network training server 110. To enforce this monotonic relationship, some embodiments described herein enforce a set of one or more monotonicity constraints in an architecture of the MRNN 120 as well as in a training process for training the MRNN 120. The set of monotonicity constraints include one or more of the following, for example: (1) each activation function used in the MRNN 120 has a derivative that is always nonnegative (referred to herein as "Constraint 1"); (2) the weights assigned to the nodes of the MRNN 120 are all nonnegative (referred to herein as "Constraint 2"); and (3) each activation function used in the MRNN 120 has a strictly nonnegative range of outputs (referred to herein as "Constraint 3"). In some aspects, the third of these (i.e., each activation function used in the MRNN 120 has a strictly nonnegative range) is used if the MRNN 120 is a monotonic long short-term memory (MLSTM) network. As shown in the analysis below, the MRNN 120 is trained with these monotonicity constraints, and thus the resulting trained MRNN 120 retains the monotonicity constraints such that the risk indicators output by the MRNN 120 have a monotonic relationship with each predictor variable 124 used as input to the MRNN 120.

An RNN, as compared to a feedforward neural network (i.e., a neural network that is not recurrent), includes one or more recurrent connections in the RNN. Such recurrent connections are in the form of self-connected layers or complex nodes that are self-connected. To process a sequence of inputs through the RNN, these recurrent layers utilize information about their previous state along with the current inputs to produce an updated state. A feedforward neural network would process the whole sequence of inputs at once and attempt to map the entire trajectory to the output. In contrast, an RNN can process one input at a time, thereby updating an internal state representation, referred to a hidden state, which summarizes the relevant information in the sequence of inputs up to that point. The output of the RNN is a function of the hidden state.

For the sake of illustration, an example of an RNN is described by the following set of equations for the hidden state $h_t$ and for an output $y_t$, where the subscript t denotes time:

$$h_t = \varphi(Wx_t + Uh_{t-1} + b_h)$$

$$y_t = \psi(Vh_t + b_y)$$

In this set of equations, referred to herein as Equation Set 1, $x_t$, $y_t$, and $h_t$ are respectively the input vector, output vector, and hidden state vector of the RNN at time t; the functions $\varphi$ and $\psi$ are respectively the hidden state activation function and the output activation function; the matrices W, U, and V are weight matrices whose entries are weights of nodes in the RNN; and $b_h$ and $b_y$ are bias vectors.

Equation Set 1 includes recurrence. Given the repeated application of the equations therein, at time $t=\tau$, an output $y_\tau$ is a function of every $x_{t \leq \tau}$. With monotonicity, the function $y_\tau$ is either non-decreasing or non-increasing over the entire domain of the input variable. In some aspects, a non-decreasing function is used, for instance where credit balance is a predictor variable (i.e., an input variable) and default probability is the risk indicator being output. In the case of a non-decreasing function, it is required that $$\frac{\partial y_\tau}{\partial x_{t \leq \tau}} \geq 0.$$

The matrix $$\frac{\partial y_\tau}{\partial x_{t \leq \tau}}$$

is the input-output Jacobian matrix with rows equal to the number of outputs and columns equal to the number of inputs. Each entry of this matrix is the derivative of one of the outputs (e.g., a risk indicator) with respect to one of the inputs (e.g., a predictor variable) at time t. Using the chain rule yields the following, referred to as Equation 2:

$$\frac{\partial y_\tau}{\partial x_{t \leq \tau}} = \frac{\partial y_\tau}{\partial h_\tau} \frac{\partial h_\tau}{\partial h_t} \frac{\partial h_t}{\partial x_t} \geq 0$$

Working out the partial derivatives in the above by using the RNN equations in Equation Set 1 yields the following:

For $t = \tau$:

$$\frac{\partial y_\tau}{\partial h_\tau} = \psi'(Vh_\tau + b_y)V$$

$$\frac{\partial h_\tau}{\partial h_t} = 1$$

$$\frac{\partial h_t}{\partial x_t} = \varphi'(Wx_t + Uh_{t-1} + b_h)W$$

For $t < \tau$:

$$\frac{\partial y_\tau}{\partial h_\tau} = \psi'(Vh_\tau + b_y)V$$

$$\frac{\partial h_\tau}{\partial h_t} = \frac{\partial h_\tau}{\partial h_{\tau-1}} \cdots \frac{\partial h_{t+1}}{\partial h_t} = \prod_{i=t+1}^{\tau} \varphi'(Wx_i + Uh_{i-1} + b_h)U$$

$$\frac{\partial h_t}{\partial x_t} = \varphi'(Wx_t + Uh_{t-1} + b_h)W$$

Plugging the above into Equation 2 yields the following, which is referred to as Equation Set 3:

$$\frac{\partial y_\tau}{\partial x_\tau} = (\psi'(Vh_\tau + b_y)V)(\varphi'(Wx_\tau + Uh_{\tau-1} + b_h)W) \geq 0$$

$$\frac{\partial y_\tau}{\partial x_{t<\tau}} = (\psi'(Vh_\tau + b_y)V)\left(\prod_{i=t+1}^{\tau} \varphi'(Wx_i + Uh_{i-1} + b_h)U\right)(\varphi'(Wx_t + Uh_{t-1} + b_h)W) \geq 0$$

Although the above inequalities in Equation Set 3 appear complex, the following monotonicity constraints, used together, ensure that the left sides of these inequalities yield nonnegative matrices: (1) choose activation functions, $\varphi$ and $\psi$, whose derivatives are always nonnegative; and (2) ensure the weight matrices V, U, and W are all nonnegative matrices (i.e., each cell of each such matrix is nonnegative). Thus, some aspects described herein use one or both of these monotonicity constraints in a training process to ensure monotonic outputs of the MRNN 120.

Although there may be other approaches possible to ensure that the left sides of the inequalities in Equation Set 3 are nonnegative, the use of the above monotonicity constraints has the benefit of being simple to implement. Certain common activation functions, such as sigmoid, hyperbolic tangent (tanh), softplus, and ReLU, have strictly nonnegative derivatives and are thus useable to meet the first of these monotonicity constrains. Additionally or alternatively, the entries in the weight matrices can be transformed, or updated, by an exponential function of existing entry values or through the use of some other function that maps real numbers to nonnegative real numbers, such as softplus or ReLU.

Constraining the network to learning monotonically increasing functions of the inputs can prevent the network from learning decreasing functions of the inputs, whether monotonic or otherwise. However, in many cases, the problem desired to be solved can be reformulated to make use of a non-decreasing monotonic relationship of outputs to inputs. For instance, if the true relationship between an $i^{th}$ input $x_i$ at time t and an output $y_\tau$ at time $\tau \geq t$ is $$\frac{\partial y_t}{\partial x_{it}} \leq 0,$$

then changing the sign on the input allows the MRNN 120 to learn the appropriate relationship. That true relationship (i.e., non-decreasing or non-increasing) can be uncovered using statistical methods or business knowledge, and as needed, inputs to the MRNN 120 can be preprocessed, such as through the use of program code, to change the signs of certain inputs.

To make the architectural solution to Constraint 2, as described above, more explicit, a function $\zeta$ can be added to Equation Set 1, where $\zeta$ maps real numbers to nonnegative real numbers. For instance, the function $\zeta$ can be an exponential function, softplus, or ReLU. Additionally, in some embodiments, due to Constraint 1, $\varphi$ and $\psi$ are functions whose derivatives are always nonnegative (e.g., sigmoid, an exponential function, softplus, or ReLU). This yields the following equations, which will be used later in this disclosure:

$$h_t = \varphi(\zeta(W)x_t + \zeta(U)h_{t-1} + b_h)$$

$$y_t = \psi(\zeta(V)h_t + b_y)$$

Determination of Monotonicity Constraints for Training an MLSTM

Figure 3:
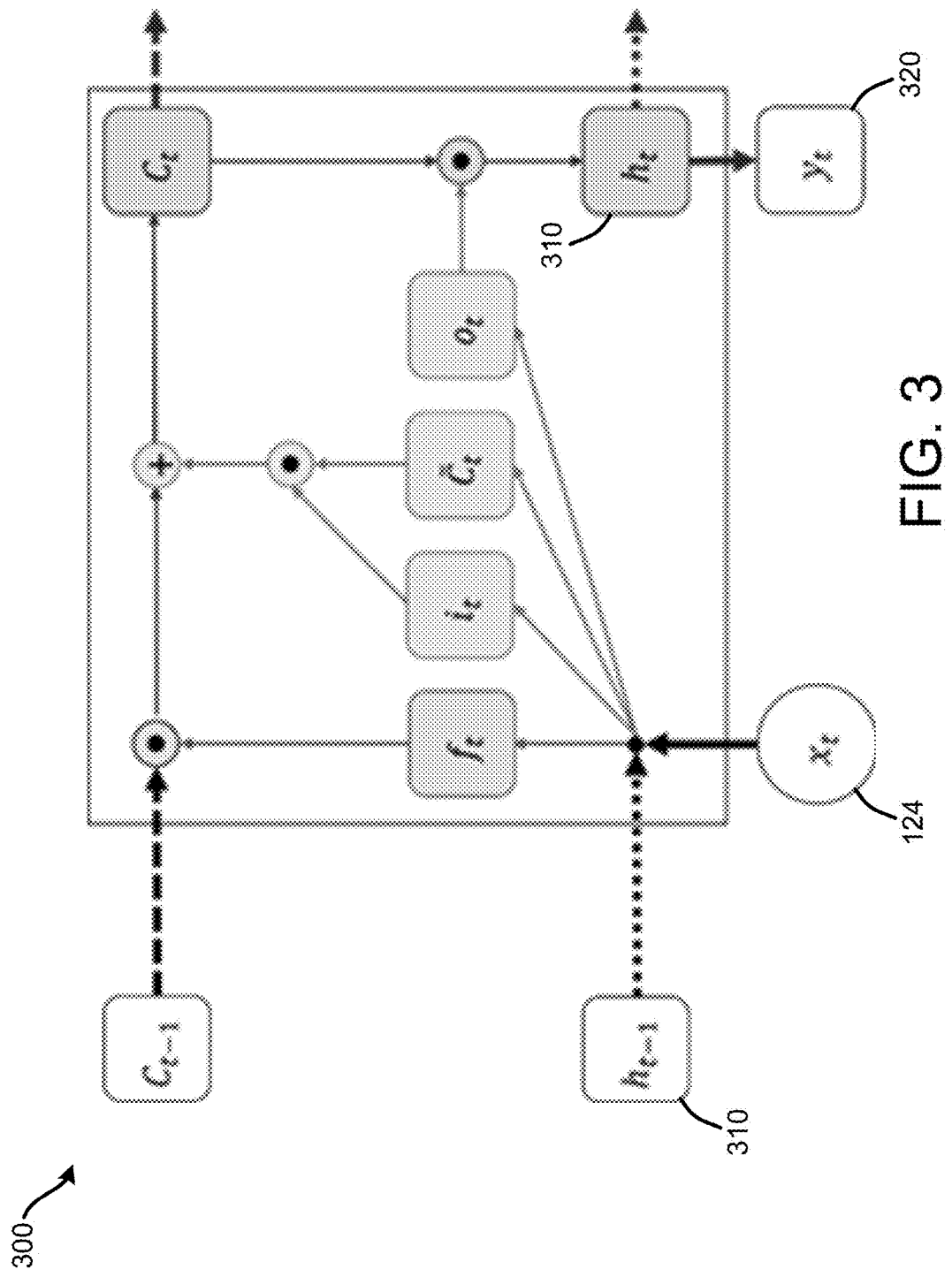
FIG. 3 is a diagram depicting an example of a cell of a monotonic long short-term memory (MLSTM) network, according to certain aspects of the present disclosure.

An RNN, including an MRNN 120, such as that described by Equation Set 1 can be difficult to train via standard gradient-based optimization as the length of the input sequence grows. This can occur due to vanishing gradients, whereby the contribution to the gradient from more temporally distant inputs becomes inordinately small. A popular solution to this problem has been a gated recurrent architecture known as the long short-term memory network, which includes long short-term memory cells. In contrast to some RNNs, an LSTM can robustly learn long-term dependencies. An LSTM is more complex than a simple RNN, such as those described by Equation Set 1, and there are several variations. A variant of an LSTM cell is illustrated in FIG. 3 and described by the following set of equations, referred to as Equation Set 4:

$$h_t = \psi(C_t) \circ o_t$$

$$C_t = f_t \circ C_{t-1} + i_t \circ \tilde{C}_t$$

$$\tilde{C}_t = \psi(W_C x_t + U_C h_{t-1} + b_C)$$

$$i_t = \sigma(W_i x_t + U_i h_{t-1} + b_i)$$

$$f_t = \sigma(W_f x_t + U_f h_{t-1} + b_f)$$

$$o_t = \sigma(W_o x_t + U_o h_{t-1} + b_o)$$

In addition to maintaining one or more hidden states 310, an example of which is labeled $h_t$ in FIG. 3, an LSTM also maintains a cell state $C_t$. In some aspects, the LSTM cell 300 has three gates, including an input gate $i_t$, an output gate $o_t$, and a forget gate $f_t$, the three of which control the flow of information respectively into, out of, and through the LSTM cell 300. In the above, $\tilde{C}_t$ is the block input, which combines information from the input at time t with information from the previous hidden state $h_{t-1}$ to create candidate information to add to the cell state. The input gate controls how much of this candidate information is actually added. As shown in Equation Set 4, two activation functions are used in this example, a chosen activation function $\psi$ for the block input and the hidden state 310, and sigmoid (i.e., $\sigma$) for the three gates. A conventional LSTM might use tanh for $\psi$; however, as will be discussed below, the hyperbolic tangent function tanh is not compliant with certain monotonicity constrains in some aspects. It will be understood that activation functions other than sigmoid or those mentioned herein could be used, and the two activation functions used for the MLSTM may or may not be the same as each other. Additionally, the $\circ$ operator in Equation Set 4 is used to denote elementwise multiplication.

In the RNN described by Equation Set 1, the hidden state $h_t$ is overwritten at each time step, and that hidden state $h_t$ is output by a cell. In the LSTM described by Equation Set 4, however, the hidden state $h_t$ is a function of the cell state Ct. The cell state provides a direct connection to temporally distant states, potentially modulated by the forget gate, and the cell state can be modified only by the controlled addition of new information or by scaling with the forget gate. The three gates control information flow by scaling values with an elementwise multiplication with a number between 0 and 1, either driving values to 0 or leaving them unchanged.

Some aspects train and use an MLSTM, which is an LSTM whose output (e.g., a risk indicator 320 such as default probability) has a monotonic relationship with each input (e.g., a predictor variable 124 such as credit balance or savings balance). To ensure that the output of the MLSTM is a monotonically increasing function of the inputs, some aspects require that $$\frac{\partial y_\tau}{\partial x_{t \leq \tau}} \geq 0,$$

which implies that $$\frac{\partial y_\tau}{\partial h_\tau} \frac{\partial h_\tau}{\partial h_t} \frac{\partial h_t}{\partial x_t} \geq 0.$$

An output layer $y_t$ is not included in the above Equation Set 4; there could be one or multiple layers of the MLSTM before arriving at an output layer and, thus, arriving at an output. However, regardless of the number of layers, as long as they are constructed such that $$\frac{\partial y_\tau}{\partial h_\tau} \geq 0,$$

monotonicity can be achieved by ensuring that $$\frac{\partial h_\tau}{\partial h_t} \frac{\partial h_t}{\partial x_t} \geq 0.$$

Given the above, it is the case that $$\frac{\partial h_\tau}{\partial h_t} = \frac{\partial h_\tau}{\partial h_{\tau-1}} \cdots \frac{\partial h_{t+1}}{\partial h_t}.$$

Because each term on the right of this expansion differs only with respect to the index, ensuring that every entry of $$\frac{\partial h_\tau}{\partial h_{\tau-1}}$$

is greater than or equal to zero ensures that every entry of $$\frac{\partial h_\tau}{\partial h_t}$$

is also greater than or equal to 0.

Explicitly working out $$\frac{\partial h_t}{\partial h_{t-1}} \text{ and } \frac{\partial h_t}{\partial x_t}$$

for the LSTM equations in Equation Set 4 gives the following, referred to as Equation Set 5:

$$\frac{\partial h_t}{\partial h_{t-1}} = (\psi'(C_t) \circ o_t)\left(C_{t-1}\frac{\partial f_t}{\partial h_{t-1}} + \tilde{C}_t\frac{\partial i_t}{\partial h_{t-1}} + i_t\frac{\partial \tilde{C}_t}{\partial h_{t-1}}\right) + \psi(C_t)\frac{\partial o_t}{\partial h_{t-1}}$$

$$\frac{\partial h_t}{\partial x_t} = (\psi'(C_t) \circ o_t)\left(C_{t-1}\frac{\partial f_t}{\partial x_t} + \tilde{C}_t\frac{\partial i_t}{\partial x_t} + i_t\frac{\partial \tilde{C}_t}{\partial x_t}\right) + \psi(C_t)\frac{\partial o_t}{\partial x_t} \text{ where}$$

$$\frac{\partial o_t}{\partial h_{t-1}} = \sigma'(W_o x_t + U_o h_{t-1} + b_o)U_o$$

$$\frac{\partial o_t}{\partial x_t} = \sigma'(W_o x_t + U_o h_{t-1} + b_o)W_o$$

$$\frac{\partial i_t}{\partial h_{t-1}} = \sigma'(W_i x_t + U_i h_{t-1} + b_i)U_i$$

$$\frac{\partial i_t}{\partial x_t} = \sigma'(W_i x_t + U_i h_{t-1} + b_i)W_i$$

$$\frac{\partial f_t}{\partial h_{t-1}} = \sigma'(W_f x_t + U_f h_{t-1} + b_f)U_f$$

$$\frac{\partial f_t}{\partial x_t} = \sigma'(W_f x_t + U_f h_{t-1} + b_f)W_f$$

$$\frac{\partial \tilde{C}_t}{\partial h_{t-1}} = \psi'(W_C x_t + U_C h_{t-1} + b_C)U_C$$

$$\frac{\partial \tilde{C}_t}{\partial x_t} = \psi'(W_C x_t + U_C h_{t-1} + b_C)W_C$$

$$\frac{\partial C_{t-1}}{\partial h_{t-1}} = 0$$

$$\frac{\partial C_{t-1}}{\partial x_t} = 0$$

Although Equation Set 5 is more complex than the equations for the other RNN described by Equation Set 1, a slight modification of the monotonicity constraints for that other RNN can ensure monotonicity. Specifically, in some aspects, an MLSTM has a monotonic relationship between its outputs and its inputs by enforcement of the following monotonicity constraints: (1) choose activation functions whose derivatives are always nonnegative; (2) ensure the weight matrices V, U, and W are all nonnegative matrices (i.e., each cell of each such matrix is nonnegative); and (3) choose activation functions with strictly nonnegative ranges. Thus, some aspects described herein use one or both of these monotonicity constraints to ensure monotonic outputs of the MRNN 120 if the MRNN 120 is an MLSTM.

It should be noted that the tanh activation function commonly used in LSTMs has a range from −1 to +1, which does not meet the above monotonicity constraints. As such, a tanh activation function can be replaced with a sigmoid activation function as needed. Additionally, as in the other RNN above, the entries of the weight matrices can be transformed with an exponential function to ensure all weight matrices are nonnegative.

To make the architectural solution to Constraint 2, as described above, more explicit for the MLSTM, a function $\zeta$ can be added to Equation Set 5, where $\zeta$ maps real numbers to nonnegative real numbers. For instance, the function $\zeta$ is an exponential function, softplus, or ReLU. Additionally, due to Constraint 1 and Constraint 3, the $\psi$ are functions with derivatives that are always nonnegative and whose ranges are strictly nonnegative (e.g., sigmoid, an exponential function, softplus, or ReLU). Specifically, to ensure the cell state remains bounded, some embodiments of the MLSTM use a sigmoid function. This yields the following equations, which will be used later in this disclosure:

$$h_t = \psi(C_t) \circ o_c$$

$$C_t = f_t \circ C_{t-1} + i_t \circ \tilde{C}_t$$

$$\tilde{C}_t = \psi(\zeta(W_C)x_t + \zeta(U_C)h_{t-1} + b_C)$$

$$i_t = \sigma(\zeta(W_i)x_t + \zeta(U_i)h_{t-1} + b_i)$$

$$f_t = \sigma(\zeta(W_f)x_t + \zeta(U_f)h_{t-1} + b_f)$$

$$o_t = \sigma(\zeta(W_o)x_t + \zeta(U_o)h_{t-1} + b_o)$$

Figure 4:
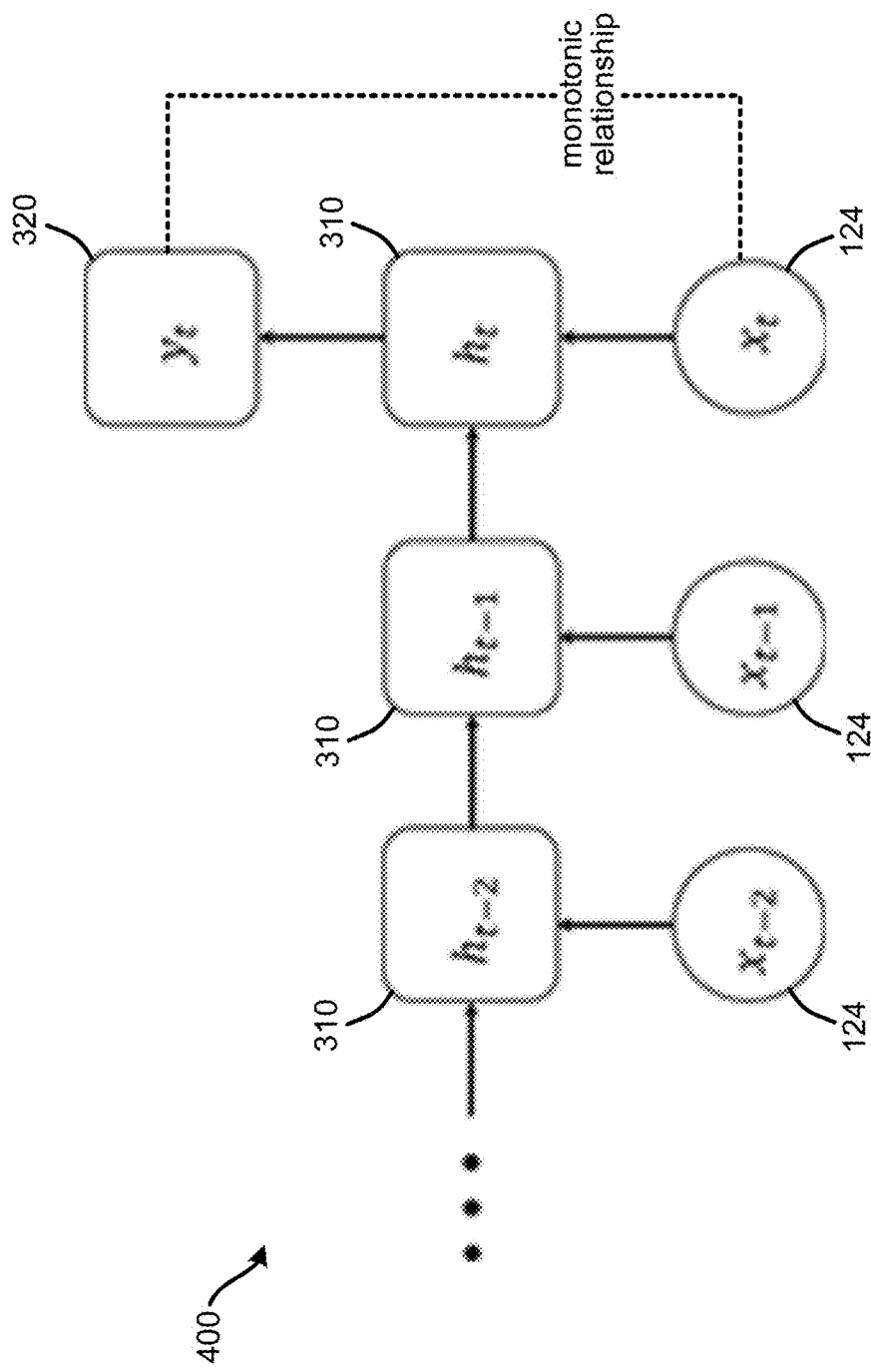
FIG. 4 is a diagram depicting an example of an MRNN, such as an MLSTM, that can be trained and used according to certain aspects of the present disclosure.

FIG. 4 is a diagram of an example of an MRNN 120, such as an MLSTM 400, according to certain aspects of this disclosure. As shown in FIG. 4, the MLSTM 400 or other MRNN 120 takes as input a sequence, or time series, of a predictor variable associated with a target entity about which risk assessment is sought. For instance, the predictor variable could be an account balance, such as a credit account balance. If the predictor variable $x_t$ for a time t is input into the MLSTM 400, the hidden states 310 have already been informed by previous values of the predictor variable; specifically, as shown, each hidden state 310 stores a respective value related to a value of the predictor variable at a respective time corresponding to that hidden state 310. Thus, a hidden state $h_{t-1}$ stores a value related to (e.g., a function of) the predictor variable at time t−1, a hidden state $h_{t-2}$ stores a value related to the predictor variable at time t−2, and this is the case for each hidden state 310 extending back across the hidden states 310 in the MRNN 120. To process the input $x_t$ corresponding to the value of the predictor variable at time t, the MRNN 120 updates the hidden state $h_t$ based on the input and determines an output based on this updated hidden state 310. In some aspects, the output $y_t$ is a risk indicator 320 that indicates the probability of the target entity defaulting (e.g., on the repayment of a debt) given the sequence of the predictor variable through time t.

Example Training of a Monotonic Recurrent Neural Network

Figure 5:
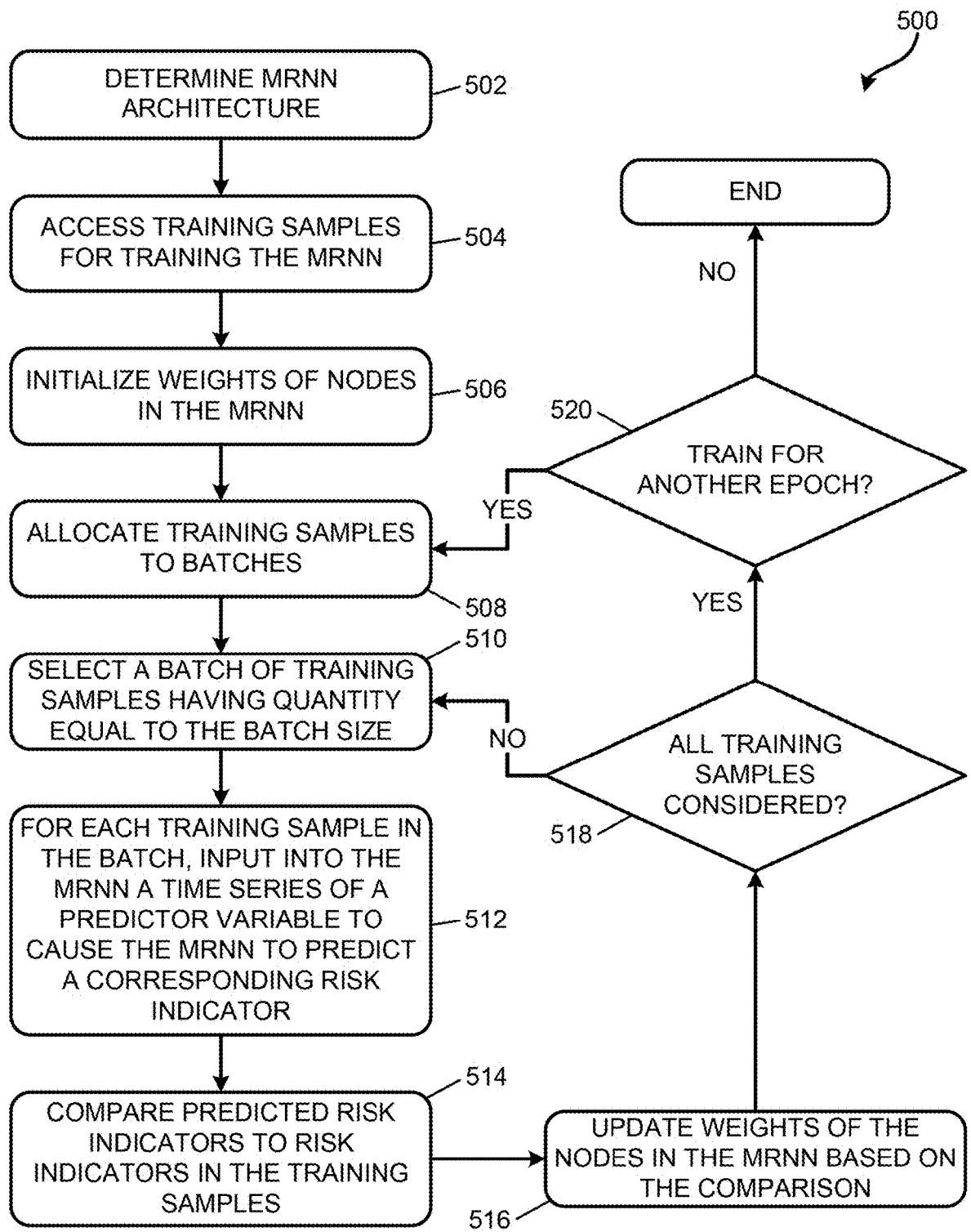
FIG. 5 is a flow diagram depicting an example of a process for training an MRNN, such as an MLSTM, according to certain aspects of the present disclosure.

FIG. 5 is a flow diagram depicting an example of a process 500 for training an MRNN 120, such as an MLSTM 400, according to certain aspects of the present disclosure. In some aspects, training the MRNN 120 is performed by the network training application 112; however, it will be understood that the training described herein can be performed by some other component.

At operation 502, the process 500 involves determining an architecture for the MRNN 120. Determining the architecture may include, for instance, one or more of the following: determining activation functions, setting a batch size for training, or determining values of hyperparameters.

In some aspects, the MRNN 120 is constrained by a set of monotonicity constraints; for instance, the set of monotonicity constraints require that (1) each activation function used in the MRNN 120 has a derivative that is always nonnegative; (2) the weights assigned to the nodes of the MRNN 120 are all nonnegative; and (3) each activation function used in the MRNN 120 has a strictly nonnegative range of outputs. Thus, to comply with these monotonicity constraints, an aspect of the network training application 112 selects activation functions for the MRNN 120 that have strictly nonnegative outputs and derivatives that are always nonnegative. For example, such activation functions include softplus and ReLU.

An aspect of the network training application 112 may select a batch size for training the MRNN 120, where the batch size is the quantity of training samples 126 that will be processed through the MRNN 120 before updating the MRNN 120 based on a comparison of actual outputs, as generated by the MRNN 120, to expected outputs of the MRNN 120, as indicated in the training samples 126. Some aspects described herein use mini-batches having a small batch size, such as two to five training samples 126 per batch. Utilizing a small batch size can help to regularize the MRNN 120.

At operation 504, the process 500 involves accessing training samples 126 for training the MRNN 120. Each training sample 126 may include one or more predictor variables 124 labeled as input and an expected risk indicator 320 labeled as output. Given these training samples 126, the MRNN 120 will learn how to map a set of one or more predictor variables 124, which are the same predictors as those used in training, to a corresponding risk indicator 320. Various techniques may be used to obtain the training samples 126 so as to provide the network training application 112 access to the training samples 126; the particular one or more techniques used may be based in part on the intended use of the MRNN 120.

In one example, the training samples 126 are determined from proprietary data, such as a preprocessed portion of the Advanced Decision Attributes (ADA) data, so as to train the MRNN 120 to map predictor variables 124 to risk indicators 320. The proprietary data includes human-engineered features, and proprietary the data is arranged in monthly archives, each of which is a cross-sectional snapshot of customers during the corresponding month and each of which includes one observation for each customer. Because the proprietary data is not stored in time series or panel format, some aspects preprocess a subset of the proprietary data or use a preprocessed subset of the proprietary data to obtain a variation of that subset of the proprietary data in panel format. In one example, the preprocessed subset includes a dataset that includes twenty-four months of data with fifty-five attributes per customer.

In this example, because the proprietary data was originally used for marketing and not for risk modeling, some aspects create a new expected output variable, where that new expected output is a type of risk indicator 320. For instance, the proprietary data encodes the greatest number of cycles late a customer has been across all accounts over the previous twenty-four months. In the proprietary data, a value of 0 means a customer has not been late on any trades in the previous twenty-four months, and a value of 1 means the customer has been a maximum of one cycle (e.g., thirty days, one month) late. In this example, the MRNN 120 is being configured to predict the default probability as the risk indicator 320, where the default probability is the probability of being at least ninety days late. Thus, to determine expected outputs to use, some aspects determine a binarized variable representing whether a customer was ever late by three cycles during the subsequent twenty-four month observation window. For instance, a customer who was ninety days late at least once in the twenty-four months (e.g., having a value of three or more for the value of maximum cycles late) is assigned an expected output of 1, and a customer who was never ninety days late in the twenty-four months (e.g., having a value less than three) is assigned an expected output of zero. In some aspects, the data related to each individual customer in the dataset represents a single training sample 126 corresponding to that individual customer, where that data includes one or more predictor variables 124 (e.g., balances over time), such as one or more time series of such predictor variables 124, and a risk indicator 320 equal to the expected output (i.e., 1 or 0 based on whether the customer was ever ninety days late). After being determined, the training samples 126 may be saved in a storage medium accessible by the network training application 112.

At operation 506, the process 500 involves initializing network parameters, such as weights of nodes, in the MRNN 120. In some aspects, given the monotonicity constraints of this example, the MRNN 120 is required to have nonnegative values for all weights assigned to the nodes of the MRNN 120, as those weights make up the weight matrices describing the MRNN 120. Thus, an aspect of the network training application 112 sets each such weight of the MRNN 120 to an initial nonnegative value. However, if an exponential function, or other function mapping reals to nonnegative reals, is being used to transform the weights in a training process, then initialization to a nonnegative value is not necessary, because the exponential function will map the weights to a nonnegative value regardless of a current weight value.

At operation 508, the process 500 involves allocating training samples to batches. For instance, in some embodiments, the network training application 112 divides the set of training samples into batches, with each batch having a quantity of training samples equal to the batch size determined at operation 502. If the total number of training samples is not evenly divisible by the batch size, then a batch may include the remainder of training samples other than those that are allocated to batches of the batch size.

At operation 510, the process 500 involves selecting a batch of training samples 126 having a quantity of training samples 126 equal to the batch size or, if fewer training samples 126 than the batch size remain, selecting the remaining training samples 126. Operation 510 begins an iterative loop in which, in each iteration, the training samples 126 in the selected batch are considered and used for updating (i.e., training) the MRNN 120.

At operation 512, the process 500 involves, for each training sample 126 in the batch, inputting the time series of the one or more predictor variables 124 of that training sample 126 into the MRNN 120 and thereby causing the MRNN 512 to process the predictor variables 124 to determine a risk indicator 320 from the one or more predictor variables 124.

At operation 514, the process 500 involves, for the training samples 126 in the batch, comparing the risk indicators 320 determined in operation 512 to the expected risk indicators 320 in the training samples 126 themselves. For instance, an aspect of the network training application 112 applies an objective function, also referred to as a loss function, to the determined risk indicators 320 and the expected risk indicators 320 to compute an error describing how the determined risk indicators 320 diverge from the expected risk indicators 320.

At operation 516, the process 500 involves updating the weights of the MRNN 120 based on the comparison performed at operation 514 or, more specifically, based on the error. For instance, an aspect of the network training application 112 updates the weights by updating each weight to have a value of an exponential function of its respective current weight and the error determined at operation 514. Because an exponential function is used, each weight remains nonnegative, as required by the monotonicity constraints. However, it will be understood that some aspects can use other types of functions, other than exponential, to update the weights as long as the updated weights comply with the monotonicity constraints (e.g., by being nonnegative). For instance, rather an exponential function, softplus can be used to transform the weights of the MRNN 120.

At decision operation 518, the process 500 involves determining whether any training samples 126 have not yet been considered for training the MRNN 120. If such training samples 126 remain, then the process 500 returns to operation 510 to select another batch of training samples 126. Otherwise, if no training samples 126 remain for consideration, then the MRNN 112 has been trained for an epoch, and the process 500 proceeds to decision operation 520.

At decision operation 520, the process 500 involves deciding whether to train the MRNN 120 for another epoch. For instance, this decision can be made by comparing the number of epochs already completed to a number of desired epochs such that, if the number of desired epochs has not been reached, the network training application 112 can decide to perform another epoch of training. If the network training application 112 decides to perform another epoch of training, then the process 500 returns to operation 508, where the training samples are reallocated into batches for another epoch of training.

However, if no more epochs of training are being performed, then the process 500 ends at operation 522. At that point, the MRNN 120 has been trained in accordance with the monotonicity constraints, and thus, output risk indicators 320 have a monotonic relationship with each predictor variable 124.

In one example implementation of training, the MLSTM 400 takes as input a three-dimensional input array that encapsulates batches in a first dimension, time sequences in a second dimension, and the values of predictor variables 124 in a third dimension. Thus, the input array has a size of {batch size, sequence length, predictor variable quantity}; more specifically, in this example, the network training application 112 uses a mini-batch size of two training samples 126 per batch, a sequence length of twenty-four (i.e., one for each month of data for twenty-four months of data), and fifty-five predictor variables 124. In this example, the target variable, which is the intended output of the MLSTM 400, is a risk indicator 320, which is binary in a training process. The risk indicator 320 is in the form of an output array that has a size of {batch size, 1} with one output entry per batch. In this example implementation, the size of the hidden state vector is twenty-four, and the learning rate is 0.0001. With the exception of the bias terms, the weights of the nodes are initialized from a truncated normal distribution with a mean of −5 and a standard deviation of 0.1. To account for the use of the exponential function, this example aspect uses the negative mean of the weights at initialization to ensure the weights start out close to zero, thus avoiding wild swings in the weight values. The bias weights are initialized to a value of 0, with the exception of the forget gate biases, which are initialized to a value of 1. In this example, the MLSTM 400 is trained for a hundred epochs. Various other implementations are possible and within the scope of this disclosure.

Example of Implementing an Attention Mechanism in the MRNN

Some aspects of the MRNN 120 implement an attention mechanism to enable to the MRNN 120 to utilize the full sequence of hidden states 310 in the determination of which information from the hidden states 310 is passed forward to subsequent layers of the MRNN 120. Generally, a limitation of RNNs is that all relevant prior information is compressed into a single hidden state vector. Use of an attention mechanism is one approach for addressing this limitation. In an aspect that utilizes attention, the output layer or other subsequent layers following the hidden states 310 of the MRNN 120 have access to the hidden states 310 in the form of a weighted sum. This weighted sum of hidden states 310 is referred to as a context vector, an example of which can be described as $v = \Sigma_{t=0}^{t=\tau} \alpha_t h_t$ where $$\alpha_t = \frac{\exp(w_t)}{\sum_{i=0}^{i=\tau} \exp(w_i)}.$$

This is an attention mechanism in which there is a single context vector and attention weights are learned parameters. In general, there can be a context vector for each output. In some aspects, the MRNN 120 uses only one context vector for ease of implementation. Additionally, in some aspects, a respective attention weight applicable to a particular hidden state 310 is a function of the particular hidden state 310 or, more specifically, a function of the time point (i.e., the temporal position in a sequence of inputs) associated with the particular hidden state 310. Generally, the attention weights at indicate which aspects of the hidden states 310 the MRNN 120 should consider, and to what degree.

Figure 6:
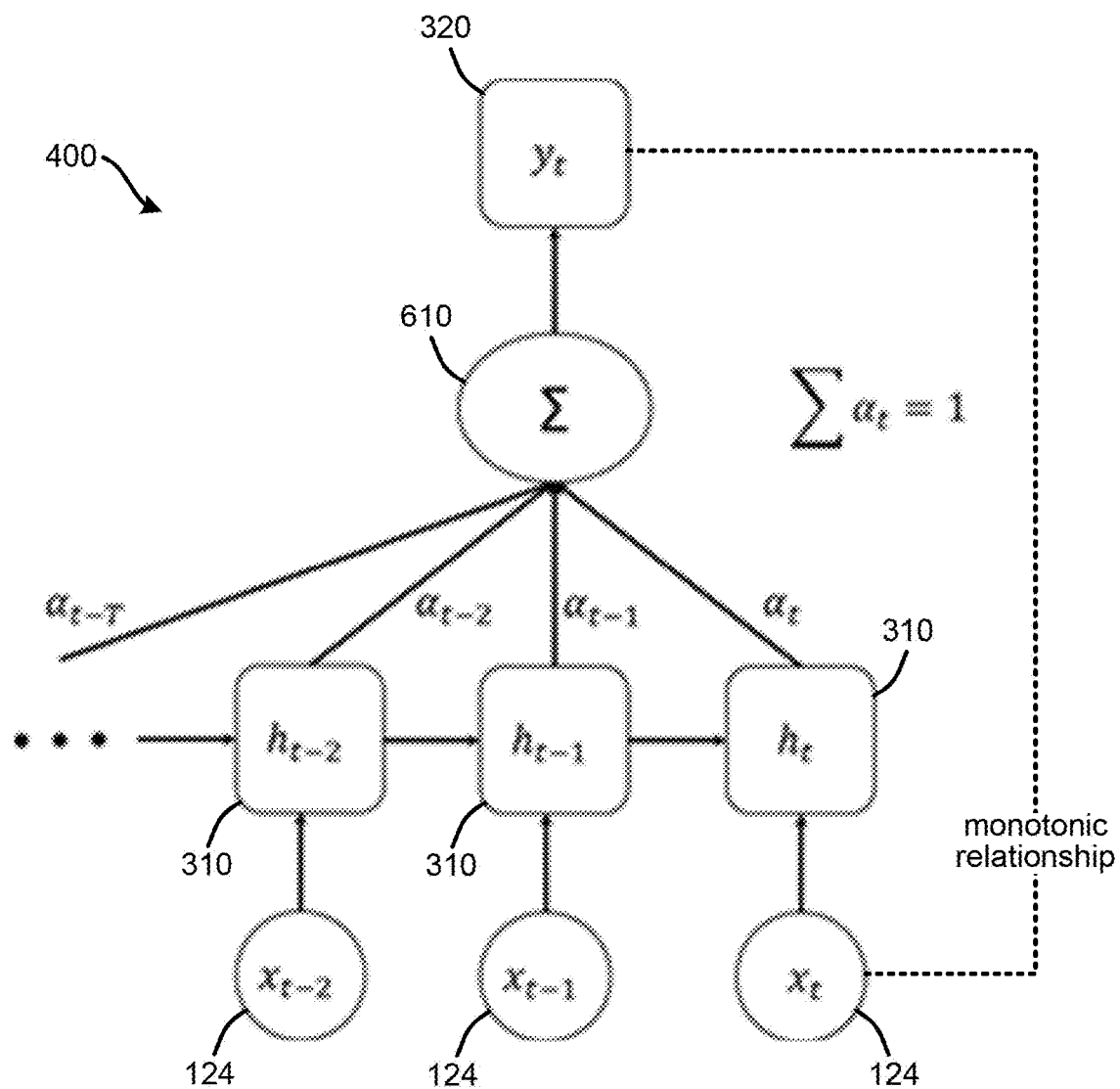
FIG. 6 is a diagram depicting an example of an MRNN, such as an MLSTM, with attention, where the MRNN can be trained and used according to certain aspects of the present disclosure.

FIG. 6 is a diagram of an example of an MRNN 120 with attention, such as an MLSTM 400 with attention, according to certain aspects of this disclosure. As shown in FIG. 6, this example of the MLSTM 400 or other MRNN 120 takes as input a sequence, or time series, of a predictor variable 124 associated with a target entity about which risk assessment is sought. For instance, the predictor variable 124 could be an account balance, such as a credit account balance. In some aspects, the MLSTM 400 with attention is described by the following equations:

$$y_\tau = \sigma(\zeta(V)v + b_y)$$

$$v = \sum\nolimits_{t=0}^{t=\tau} \alpha_t h_t$$

$$\alpha_t = \frac{e^{w_t}}{\sum_{i=0}^{i=\tau} e^{w_i}}$$

$$h_t = \psi(C_t) \circ o_t$$

$$C_t = f_t \circ C_{t-1} + i_t \circ \tilde{C}_t$$

$$\tilde{C}_t = \psi(\zeta(W_C)x_t + \zeta(U_C)h_{t-1} + b_C)$$

$$i_t = \sigma(\zeta(W_i)x_t + \zeta(U_i)h_{t-1} + b_i)$$

$$f_t = \sigma(\zeta(W_f)x_t + \zeta(U_f)h_{t-1} + b_f)$$

$$o_t = \sigma(\zeta(W_o)x_t + \zeta(U_o)h_{t-1} + b_o)$$

In the above example, the equations defining $h_t$, $C_t$, $\tilde{C}_t$, $i_t$, $f_t$, and $o_t$ are the same as those presented previously for an MLSTM 400, with the same variables, activation functions, and other aspects. In the above, v is the context vector, which is a weighted sum of all hidden state vectors; the weights $\alpha_t$ are the attention weights; the $w_i$ are learnable parameters including one $w_i$ for each $\alpha_t$; and $y_\tau$ is the output of the MLSTM 400.

If the predictor variable $x_t$ for a time t is input into the MLSTM 400, the hidden states 310 have already been informed by previous values of the predictor variable 124; specifically, as shown, each hidden state 310 stores a respective value related to a value of the predictor variable 124 at a respective time corresponding to that hidden state 310. Thus, a hidden state $h_{t-1}$ stores a value related to (e.g., a function of) the predictor variable 124 at time t−1, a hidden state $h_{t-2}$ stores a value related to the predictor variable 124 at time t−2, and this is the case for each hidden state 310 extending back across the hidden states 310 in the MRNN 120. To process the input $x_t$ corresponding to the value of the predictor variable 124 at time t, the MRNN 120 updates the hidden state $h_t$. The MLSTM 400 determines a context vector 610 as a weighted sum of the various hidden states 310. The MLSTM 400 then computes an output $y_t$, which is a function of the context vector 610. In some aspects, the output $y_t$ is a risk indicator 320 that indicates the probability of the target entity defaulting (e.g., on the repayment of a debt) given the sequence of the predictor variable 124 through time t.

Example of a Computing System for Machine-Learning Operations

Figure 7:
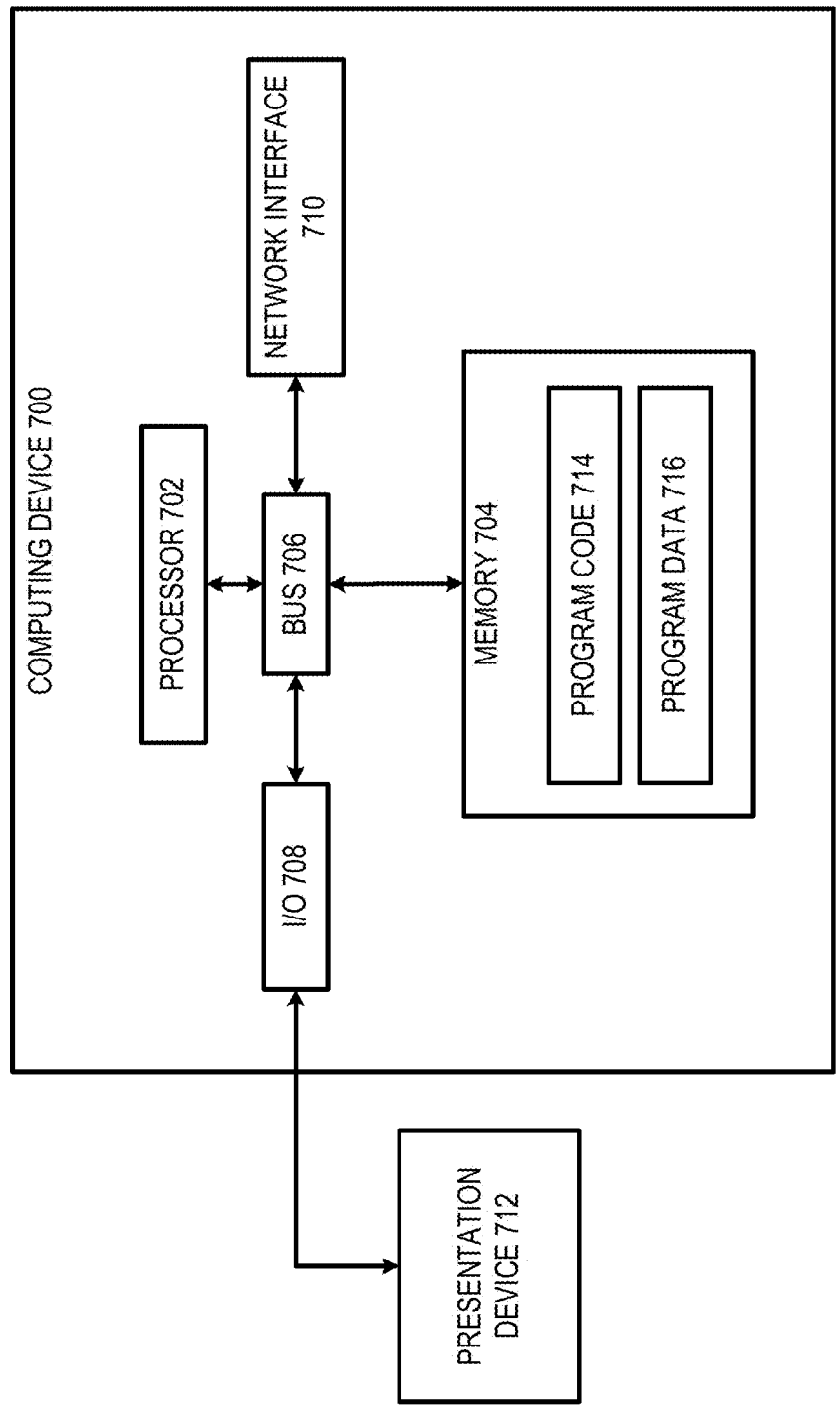
FIG. 7 is a diagram depicting an example of a computing system suitable for implementing aspects of the techniques and technologies presented herein.

Any suitable computing system or group of computing systems can be used to perform the operations for the machine-learning operations described herein. For example, FIG. 7 is a block diagram depicting an example of a computing device 700, which can be used to implement the risk assessment server 118 or the network training server 110. The computing device 700 can include various devices for communicating with other devices in the operating environment 100, as described with respect to FIG. 1. The computing device 700 can include various devices for performing one or more operations described above with reference to FIGS. 1-6.

The computing device 700 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 700 may also include a number of external or internal devices such as input or output devices. For example, the computing device 700 is shown with an input/output interface 708 that can receive input from input devices or provide output to output devices. A bus 706 can also be included in the computing device 700. The bus 706 can communicatively couple one or more components of the computing device 700.

The computing device 700 can execute program code 714 that includes the risk assessment application 114 and/or the network training application 112. The program code 714 for the risk assessment application 114 and/or the network training application 112 may be resident in any suitable computer-readable medium and may be executed on any suitable processing device. For example, as depicted in FIG. 7, the program code 714 for the risk assessment application 114 and/or the network training application 112 can reside in the memory 704 at the computing device 700 along with the program data 716 associated with the program code 714, such as the predictor variables 124 and/or the MRNN training samples 126. Executing the risk assessment application 114 or the network training application 112 can configure the processor 702 to perform the operations described herein.

In some aspects, the computing device 700 can include one or more output devices. One example of an output device is the network interface device 710 depicted in FIG. 7. A network interface device 710 can include any device or group of devices suitable for establishing a wired or wireless data connection to one or more data networks described herein. Non-limiting examples of the network interface device 710 include an Ethernet network adapter, a modem, etc.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing device 700 using one or more data networks described herein. In other aspects, the presentation device 712 can be omitted.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A system comprising:
 a first computing system configured for:
  receiving, from a second computing system, a risk assessment query that identifies a target entity,
  providing a predictor variable for the target entity to a recurrent neural network (RNN),
  computing, with the RNN, an output risk indicator from the predictor variable, the RNN having one or more layers of nodes that are interconnected, the nodes comprising one or more hidden states having stored values based on predictor values in the predictor variable, the nodes having weights causing output risk indicators of the RNN to be a monotonic function of input predictor variables that are input into the RNN,
  wherein a loss function of the RNN includes a mapping function for adjusting one or more of the weights of the nodes of the RNN, wherein the mapping function adjusts the weights of the nodes during training to minimize the loss function of the RNN subject to a set of monotonicity constraints comprising (i) a set of activation functions with derivatives that are nonnegative and (ii) a set of nonnegative weight matrices in which at least one weight value of at least one weight matrix is adjusted by the mapping function during the training, and
  transmitting the output risk indicator to the second computing system; and
 the second computing system, wherein the second computing system is communicatively coupled to the first computing system and is configured for controlling, based on the output risk indicator, access by the target entity to one or more interactive computing environments.

2. The system of claim 1, wherein the first computing system is further configured for training the RNN by performing training operations comprising:
 accessing training samples comprising training predictor variables and training risk indicators corresponding to the training predictor variables; and
 adjusting the weights of the nodes of the RNN subject to the set of monotonicity constraints, wherein the set of monotonicity constraints causes the output risk indicators computed by the RNN to be a monotonic function of the input predictor variables that are input into the RNN.

3. The system of claim 2, the training operations further comprising:
 computing, with the RNN, an updated value of an updated hidden state of the one or more hidden states as a first activation function of the set of activation functions applied to a first function, the first function comprising (i) a first weight matrix of the set of nonnegative weight matrices multiplied by the predictor variable for the target entity and (ii) a second weight matrix of the set of nonnegative weight matrices multiplied by a stored value of a hidden state of the one or more hidden states,
wherein adjusting the weights of the nodes of the RNN to minimize the loss function of the RNN subject to the set of monotonicity constraints comprises:
adjusting first weight values in the first weight matrix, wherein each cell of the first weight matrix is nonnegative, and
adjusting second weight values in the second weight matrix, wherein each cell of the second weight matrix is nonnegative.

4. The system of claim 3, wherein computing, with the RNN, the output risk indicator from the predictor variable comprises computing the output risk indicator as a second activation function of the set of activation functions of the RNN applied to a second function, the second function comprising a third weight matrix of the set of nonnegative weight matrices multiplied by the updated value of the updated hidden state,
wherein adjusting the weights of the nodes of the RNN to minimize the loss function of the RNN subject to the set of monotonicity constraints further comprises adjusting third weight values in the third weight matrix, wherein each cell of the third weight matrix is nonnegative.

5. The system of claim 4, wherein:
the first activation function has a respective derivative that is always nonnegative; and
the second activation function has an additional respective derivative that is always nonnegative.

6. The system of claim 4, wherein:
the first activation function has a respective range that is strictly nonnegative; and
the second activation function has an additional respective range that is strictly nonnegative.

7. The system of claim 1, wherein the RNN is a long short-term memory (LSTM) network.

8. A method in which one or more processing devices perform operations comprising:
training a recurrent neural network (RNN) to compute a risk indicator from a predictor variable, wherein the RNN comprises one or more layers of nodes that are interconnected, the nodes comprising one or more hidden states having stored values based on predictor values in the predictor variable,
wherein training the RNN comprises:
accessing training samples comprising training predictor variables and training risk indicators corresponding to the training predictor variables; and
adjusting weights of the nodes of the RNN subject to a set of monotonicity constraints, wherein the set of monotonicity constraints causes output risk indicators computed by the RNN to be a monotonic function of input predictor variables that are input into the RNN,
wherein a loss function of the RNN includes a mapping function for adjusting one or more of the weights of the nodes of the RNN, wherein the mapping function adjusts the weights of the nodes to minimize the loss function of the RNN subject to the set of monotonicity constraints comprising (i) a set of activation functions with derivatives that are nonnegative and (ii) a set of nonnegative weight matrices in which at least one weight value of at least one weight matrix is adjusted by the mapping function during training; and
computing, responsive to a risk assessment query for a target entity, an output risk indicator for the target entity by applying the RNN to an input predictor variable associated with the target entity, wherein the output risk indicator is usable for controlling access by the target entity to one or more interactive computing environments.

9. The method of claim 8, the operations further comprising:
computing, by the RNN, an updated value of an updated hidden state of the one or more hidden states as a first activation function of the set of activation functions applied to a first function, the first function comprising (i) a first weight matrix of the set of nonnegative weight matrices multiplied by the input predictor variable associated with the target entity and (ii) a second weight matrix of the set of nonnegative weight matrices multiplied by a stored value of a hidden state of the one or more hidden states,
wherein adjusting the weights of the nodes of the RNN subject to the set of monotonicity constraints comprises:
adjusting first weight values in the first weight matrix, wherein each cell of the first weight matrix is nonnegative, and
adjusting second weight values in the second weight matrix, wherein each cell of the second weight matrix is nonnegative.

10. The method of claim 9, wherein computing, by the RNN, the output risk indicator for the target entity comprises computing the output risk indicator as a second activation function of the set of activation functions applied to a second function, the second function comprising a third weight matrix of the set of nonnegative weight matrices multiplied by the updated value of the updated hidden state,
wherein adjusting the weights of the nodes of the RNN subject to the set of monotonicity constraints further comprises adjusting third weight values in the third weight matrix, wherein each cell of the third weight matrix is nonnegative.

11. The method of claim 10, wherein adjusting the weights of the nodes of the RNN subject to the set of monotonicity constraints further comprises processing the training samples in mini-batches to adjust the weights of the nodes.

12. The method of claim 10, wherein adjusting the weights of the nodes of the RNN subject to the set of monotonicity constraints further comprises updating the first weight values of the first weight matrix, the second weight values of the second matrix, and the third weight values of the third matrix using an exponential function.

13. The method of claim 10, wherein:
the first activation function has a respective derivative that is always nonnegative; and
the second activation function has an additional respective derivative that is always nonnegative.

14. The method of claim 10, wherein:
the first activation function has a respective range that is strictly nonnegative; and
the second activation function has an additional respective range that is strictly nonnegative.

15. The method of claim 8, wherein the RNN is a long short-term memory (LSTM) network.

16. A non-transitory computer-readable medium embodying program code for making a risk assessment, the program code comprising instructions that, when executed by a processor, cause the processor to perform operations comprising:

training a recurrent neural network (RNN) to compute a risk indicator from a predictor variable, wherein the RNN comprises one or more layers of nodes that are interconnected, the nodes comprising one or more hidden states having stored values based on predictor values in the predictor variable, wherein training the RNN comprises:

accessing training samples comprising training predictor variables and training risk indicators corresponding to the training predictor variables; and adjusting weights of the nodes of the RNN subject to a set of monotonicity constraints, wherein the set of monotonicity constraints causes output risk indicators computed by the RNN to be a monotonic function of input predictor variables that are input into the RNN, wherein a loss function of the RNN includes a mapping function for adjusting one or more of the weights of the nodes of the RNN, wherein the mapping function adjusts the weights of the nodes to minimize the loss function of the RNN subject to the set of monotonicity constraints comprising (i) a set of activation functions with derivatives that are nonnegative and (ii) a set of nonnegative weight matrices in which at least one weight value of at least one weight matrix is adjusted by the mapping function during training; and outputting the RNN as trained, wherein the RNN as trained is configured for computing, responsive to a risk assessment query for a target entity, an output risk indicator for the target entity by applying the RNN to an input predictor variable associated with the target entity.

17. The non-transitory computer-readable medium of claim 16, the operations further comprising:

computing, by the RNN, an updated value of an updated hidden state of the one or more hidden states as a first activation function of the set of activation functions applied to a first function, the first function comprising (i) a first weight matrix of the set of nonnegative weight matrices multiplied by the input predictor variable associated with the target entity and (ii) a second weight matrix of the set of nonnegative weight matrices multiplied by a stored value of a hidden state of the one or more hidden states, wherein adjusting the weights of the nodes of the RNN subject to the set of monotonicity constraints comprises:

adjusting first weight values in the first weight matrix, wherein each cell of the first weight matrix is nonnegative, and adjusting second weight values in the second weight matrix, wherein each cell of the second weight matrix is nonnegative.

18. The non-transitory computer-readable medium of claim 17, wherein the RNN as trained is further configured for computing, by the RNN, the output risk indicator for the target entity as a second activation function of the set of activation functions applied to a second function, the second function comprising a third weight matrix of the set of nonnegative weight matrices multiplied by the updated value of the updated hidden state, wherein adjusting the weights of the nodes of the RNN subject to the set of monotonicity constraints further comprises adjusting third weight values in the third weight matrix, wherein each cell of the third weight matrix is nonnegative.

19. The non-transitory computer-readable medium of claim 18, wherein:

the first activation function has a respective derivative that is always nonnegative; and the second activation function has an additional respective derivative that is always nonnegative.

20. The non-transitory computer-readable medium of claim 18, wherein:

the RNN is a long short-term memory (LSTM) network;

the first activation function has a respective range that is strictly nonnegative; and the second activation function has an additional respective range that is strictly nonnegative.

* * * * *